United States Patent [19]

Rosenberg et al.

[11] Patent Number: 4,901,055
[45] Date of Patent: Feb. 13, 1990

[54] VEHICLE DECELERATION WARNING PIEZO-SENSOR

[75] Inventors: Armand Rosenberg, Rehovot; Menashe Yeheskel, Yavne, both of Israel

[73] Assignee: Makash Advanced Piezo Technology, Hangegey, Israel

[21] Appl. No.: 246,687

[22] Filed: Sep. 20, 1988

[51] Int. Cl.$^4$ ............................................. B60Q 1/44
[52] U.S. Cl. ..................................... 340/467; 340/479
[58] Field of Search ............... 340/479, 467, 464, 669; 200/61.89, 86.5; 310/338–340, 345, 319

[56] References Cited

U.S. PATENT DOCUMENTS

| | | |
|---|---|---|
| 3,171,914 | 3/1965 | Ohanian . |
| 3,171,917 | 3/1965 | Leichsenring . |
| 3,395,388 | 7/1968 | Hendrickson . |
| 3,497,871 | 2/1970 | Damico . |
| 3,596,020 | 7/1971 | Warren . |
| 3,601,796 | 9/1971 | Mortimer . |
| 3,701,903 | 10/1972 | Merhar .......................... 310/319 X |
| 3,763,975 | 10/1973 | Fontaine . |
| 3,846,599 | 11/1974 | Fontaine . |
| 3,881,078 | 4/1975 | Kazanecki . |
| 3,911,394 | 10/1975 | Shames . |
| 3,912,892 | 10/1975 | Morehouse . |
| 3,921,750 | 11/1975 | Shames . |
| 4,021,775 | 5/1977 | Leu . |
| 4,055,090 | 10/1977 | Fuchs ........................................ 73/510 |
| 4,173,012 | 10/1979 | Burger . |
| 4,333,070 | 6/1982 | Barnes . |
| 4,686,503 | 8/1987 | Miller . |
| 4,712,098 | 12/1987 | Laing ..................................... 340/669 |
| 4,737,767 | 4/1988 | Kompanek et al. . |
| 4,788,526 | 11/1988 | Eckstein et al. ..................... 340/467 |

FOREIGN PATENT DOCUMENTS 0219858 4/1987 European Pat. Off. .
2558477 7/1977 Fed. Rep. of Germany .

Primary Examiner—Joseph A. Orsino
Assistant Examiner—Brian R. Tumm
Attorney, Agent, or Firm—Browdy and Neimark

[57] ABSTRACT

A vehicle deceleration warning apparatus for use in a vehicle having brake lights, a floorboard and an accelerator pedal, the system including a piezoelectric sensor element connected to one of the accelerator pedal or the floorboard for outputting a first signal when subjected to appropriate stress conditions, a contact element connected to the other of the accelerator pedal or the floorboard for contacting the piezoelectric sensor in a manner which is dependent upon the rate of release of the accelerator pedal and causing the sensor to output the first signal in response thereto, and a circuit element connected to the brake lights and to the piezoelectric sensor for analyzing the first signal produced by the piezoelectric sensor and for actuating the brake lights in response to the analysis when the first signal is above a predetermined threshold.

9 Claims, 7 Drawing Sheets

VEHICLE DECELERATION WARNING PIEZO-SENSOR

BACKGROUND OF THE INVENTION

1. Field of the Invention

The present invention relates to a vehicle deceleration warning apparatus which would provide early warning of an impending stop by advance brake light activation, prior to actuation of the brake pedal.

2. The Prior Art

Rear-end automobile collisions account for approximately two-thirds of the auto accidents occurring worldwide. The majority of all chain accidents occur during rush-hour traffic jams. Under those conditions, drivers often do not have enough time to react to one anothers movements. As it appears to be impossible to force drivers to maintain safe distances between cars, other solutions must be found.

One recently implemented solution is the center-high-mounted-stop lamp (CHMSL) introduced in the U.S. in the early 1980's. Pursuant to Federal regulation 49 CFR 571.108 (Standard 108) the installation of this device in all new cars became a mandatory requirement. The CHMSL provides significant advantages and benefits in preventing some rear-end collisions.

However, rear-end collisions are still occurring at an alarming rate. Other devices have been developed which are directed to the prevention of rear-end collisions and their severity by advancing the reaction-braking response in emergency braking situations; this in contrast to the CHMSL method which reduces driver's reaction time in emergency-braking situations.

The following patents disclose various types of early warning systems.

| Patent No. | Inventor |
|---|---|
| 3,171,914 | Ohanian |
| 3,171,917 | Leichsenring |
| 3,395,388 | Hendrickson |
| 3,497,871 | Damico |
| 3,596,020 | Warren |
| 3,601,796 | Mortimer |
| 3,881,078 | Kazanecki |
| 3,911,394 | Shames |
| 3,912,892 | Morehouse |
| 3,921,750 | Shames |
| 4,021,775 | Leu |
| 4,173,012 | Burger |
| 4,686,503 | Miller |

Mortimer discloses an accelerator release signal light delay actuator which delays actuation of the brake light upon release of the driver's foot from the accelerator pedal for 5 or 6 seconds following release of the accelerator. After the delay period is past, if the brake has not yet been applied, the brake lights are turned on at a intensity less than the intensity available when the brakes are actually actuated. Thus, the possibility of false indication is decreased since the person behind the front car recognizes the decreased intensity of the light indicating that the brake has not itself been actuated.

Morehouse discloses an automobile deceleration warning system in which an auxiliary pedal is positioned above the main accelerator pedal. A normally opened switch is positioned between the two pedals. Upon release of the auxiliary pedal, the switch closes, thereby lighting the brake light. According to the patent, a resistor may be included which reduces the current flow to the brake lights, thus lighting the brake lights at a lower intensity when the lights are actuated in response to the lifting of the accelerator pedal as compared with the intensity of the brake lights when the brakes are actually applied.

The Shames patents disclose a vehicle brake light warning system in which the brake lights are activated for a given period of time upon release of the accelerator pedal. This time period is sufficient for the driver to lift his foot from the accelerator to the brake pedal. If the brakes are not applied within that time period, the brake lights are turned off.

Burger, Leu, Kazanecki, Warren, Ohanian and Miller all disclose alternate systems for providing early warning of brake activation by turning on the brake light or alternative lights upon release of the accelerator pedal.

However, all of the above-noted patents suffer from a significant disadvantage in that no differentiation is made between panic stop behavior and non-panic stop behavior. Each of these devices result in a high rate of "false alarms" which can lead to a decrease in the overall warning value of the stop lamp signal itself, due to a "cry wolf" phenomenon. This leads to a significant reduction in the effectiveness of these systems.

European Pat. No. 0 219 858 discloses a device which remains ineffective in non-emergency cases. The advanced braking light device (ABLD) is an electronic device installed on a vehicle accelerator pedal. When a leading vehicle driver attempts a panic-braking operation, the accelerator pedal is released by a sudden movement when the driver's leg is shifted to apply the brake pedal as quickly as possible.

The sudden release is sensed by the ABLD and immediately after the accelerator pedal is released, the stop lights are activated. This advanced activation of the stop lights, by a fraction of 0.2–0.3 seconds, which is approximately the time necessary for the driver to move his leg from the accelerator to the brake, enables the following vehicle driver to start his reaction to the braking at an earlier stage, thus improving his chances of preventing a collision or reducing the severity thereof. The brake lights remain lit for only 1 second if the brake pedal is not actuated.

The ABLD device 10 is shown in FIGS. 1 and 2 of the present application. When the bellows 14 is in its collapsed position, i.e., the drivers foot is on the pedal, electrical contacts 38 and 41 are separated and the circuit is opened. Upon sudden release of the accelerator pedal, the switching device 40 closes and bellows 14 becomes momentarily effective to generate sub-pressure inside, thereby causing an air suction effect through the opening. This forces the flap 54 to lift and make electrical contact with the rim 22, and short-circuit the terminals 56 and 58 through the coil spring 26. By actuation of the relay 62, the brake lights 70 are turned on.

A moderate movement will not effect actuation of the brake lights since air will gradually refill the chamber within bellows 14 without causing an air-lift or suction phenomena of the required amount to overcome the coil spring force 26. The patent also discloses an electrical version of the device which does not include the bellows 14. A potentiometer is provided so as to avoid brake light activation based on slower movements of the driver's foot wherein movements below as certain speed will have no effect on the system.

The ABLD of the European patent application is bulky, complicated and expensive to manufacture. In addition, because of the number of moving parts and the provision of a flexible rubber bellows, this device is likely to wear out and break frequently thus reducing its cost effectiveness.

Patents have been issued which disclose the use of a vehicle pedal operated switch mounted on an upper end portion of the arm connected to the foot pedal (see U.S. Pat. Nos. 3,763,975, 3,846,599, and 4,333,070). It has been known to use piezoelectric crystals in key switches which form a keyboard (see U.S. Pat. No. 4,737,767).

SUMMARY OF THE INVENTION

It is an object of the present invention to provide a vehicle deceleration warning apparatus which overcomes the disadvantages noted above with respect to the prior art systems.

It is a further object of the present invention to provide a vehicle deceleration warning apparatus which has no moving parts and is simple and inexpensive to manufacture and repair.

It is a further object of the invention to provide a vehicle deceleration warning apparatus which is activated only upon emergency or panic braking conditions and not under normal driving circumstances.

It is a further object of the present invention to provide an apparatus which effectively decreases to a minimum the time between the moment a driver notices danger ahead and releases the brake pedal and the moment the brake lights are activated in emergency conditions.

It is a further object of the present invention to provide an apparatus attachable to the accelerator pedal of automobiles which will be instantaneously responsive to the abrupt or sudden release of the accelerator pedal, and activate the brake lights before activation thereof by the brake pedal.

The inventor of this application recognized that all piezoelectric crystals, such as those used in Pat. No. 4,737,767, have an inherent characteristic whereby the electrical signal generated by the piezoelectric crystal increases in magnitude as the force per unit time exerted on the crystal increases. Thus, the output of a piezoelectric crystal would be greater when a certain amount of force is exerted on the crystal in a given amount of time than when the same amount of force is exerted in a smaller period of time. The present invention was designed to make use of this inherent characteristic to create a vehicle deceleration warning apparatus which actuated the brake lights only in emergency situations.

According to the present invention, a vehicle deceleration warning apparatus is provided for use in a vehicle having brake lights, a floorboard and an accelerator pedal which comprises, piezoelectric sensor means connected to one of the accelerator pedal or the floorboard for outputting a first signal when subjected to appropriate stress conditions, contact means connected to the other of the accelerator pedal or the floorboard for contacting the piezoelectric sensor means in a manner which is dependent upon the rate of release of the accelerator pedal and causing the sensor means to output the first signal in response thereto, and circuit means connected to the brake lights and to the piezoelectric sensor means for analyzing the first signal produced by the piezoelectric sensor means and for actuating the brake lights in response to the analysis when the first signal is above a predetermined threshold.

The apparatus according to the present invention further comprises a housing. The piezoelectric sensor means comprises a piezoelectric crystal which is contained within the housing and connected to the housing such that contact with the housing causes a mechanical deformation of the crystal. The crystal is also connected to an input of the circuit means and the input is adapted to receive the first signal.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given, only by way of example, and with reference to the accompanying drawings, in which.

DETAILED DESCRIPTION OF THE PREFERRED EMBODIMENTS

Figure 1:
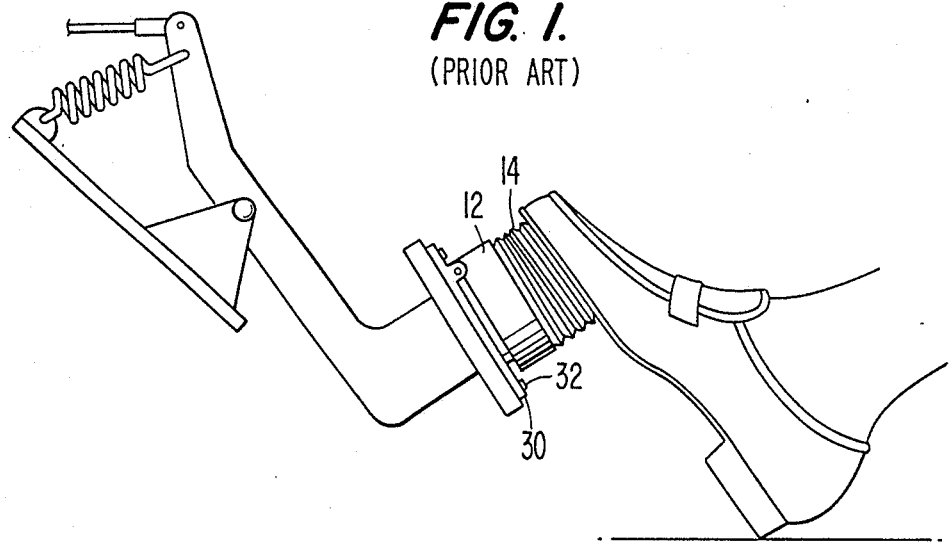
FIG. 1 illustrates the mounting of the ABLD on the accelerator pedal of a vehicle.
Figure 2:
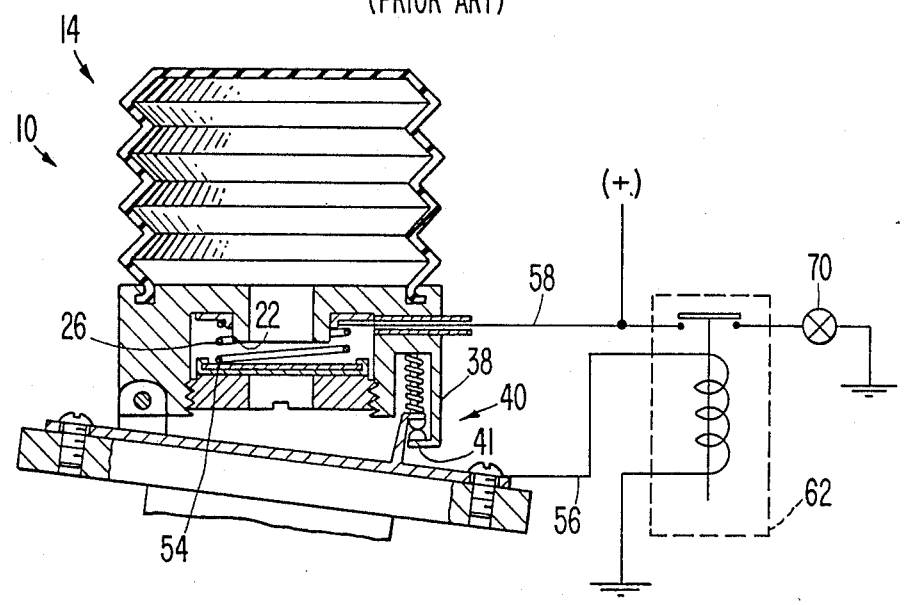
FIG. 2 is a schematic, cross-sectional view of the advanced brake light device in the prior art.
Figure 3:
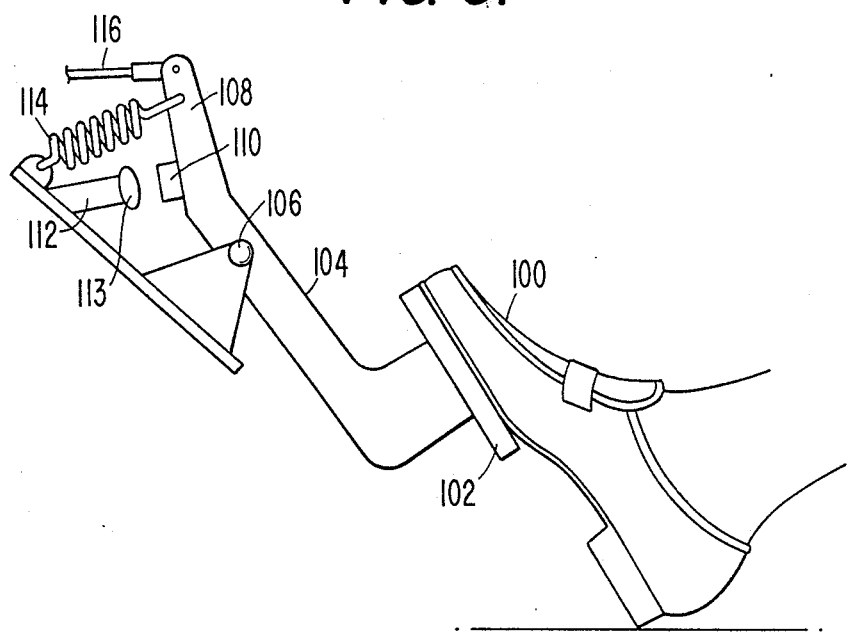
FIG. 3 illustrates the mounting of the vehicle deceleration warning sensor of the present invention on the accelerator pedal according to a first embodiment.

As schematically shown in FIG. 3, according to a first mounting embodiment the vehicle deceleration warning sensor 110 (VDWS) is mounted to the support arm 104 of the accelerator pedal. The sensor is mounted beyond the pivot point 106 on the rear end 108 of the support arm 104. A screw or pin having a base 112 and a contact head 113 is mounted on the floorboard of the Vehicle such that when the gas pedal is released, VDWS 110 comes into contact with screw 112. In all other respects, the accelerator pedal remains unchanged, in particular it is mounted to the floorboard of a car by pivot 106, coupled to the carburetor cable 116 and returned biased by spring 114. It can be seen from FIG. 3 that during normal driving of the car, pedal 102 is depressed by the driver's foot 100 and the VDWS 110 is separated from screw 112.

If the driver abruptly or suddenly releases his foot from the head portion 102 of the gas pedal, VDWS 110 comes into direct contact with screw 112 and mechanical force is applied to the piezoelectric crystal within VDWS 110. The brake lights will be activated only when the signal generated by the piezoelectric crystal is beyond a predetermined threshold value, in response to the change in the force or stress being applied by the contact with the screw 112 occurring within the predetermined time period. A signal above this threshold value will be generated when a greater force or stress is applied to the piezoelectric crystal quickly, in a small amount of time.

Due to the aforementioned inherent characteristics of piezoelectric crystals, a moderate or slow movement of the driver's foot 100 to release the head portion 102 of the gas pedal will not cause brake light activation. Because the increase in the force applied to the piezoelectric crystal must occur within a given amount of time to generate a signal having the predetermined threshold level, slow release of the pedal, which causes slow contact between the crystal and screw 112, will not actuate the brake lights.

Figure 4:
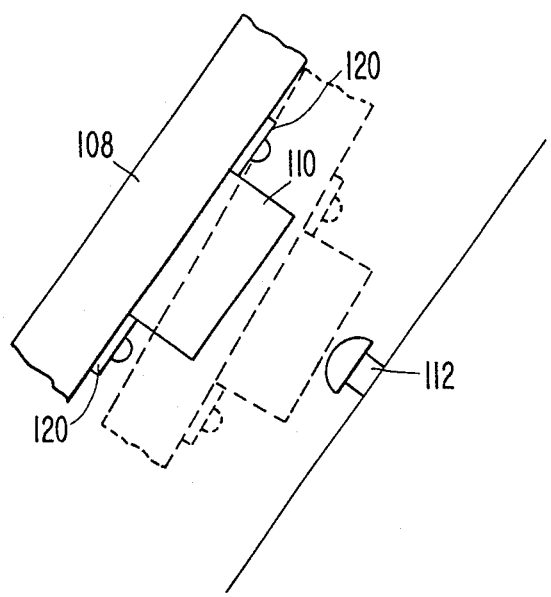
FIG. 4 is a exploded view of the VDWS according to the first embodiment of the present invention as it is actuated by movement of the gas pedal.

FIG. 4 shows an enlarged view, the mounting of the VDWS 110 to the gas pedal according to the first mounting embodiment. VDWS 110 is mounted via mounting elements 120 to the rear end 108 of support arm 104. The movement of the VDWS 110 as the gas pedal is released is shown in dotted lines in FIG. 4.

Figure 5:
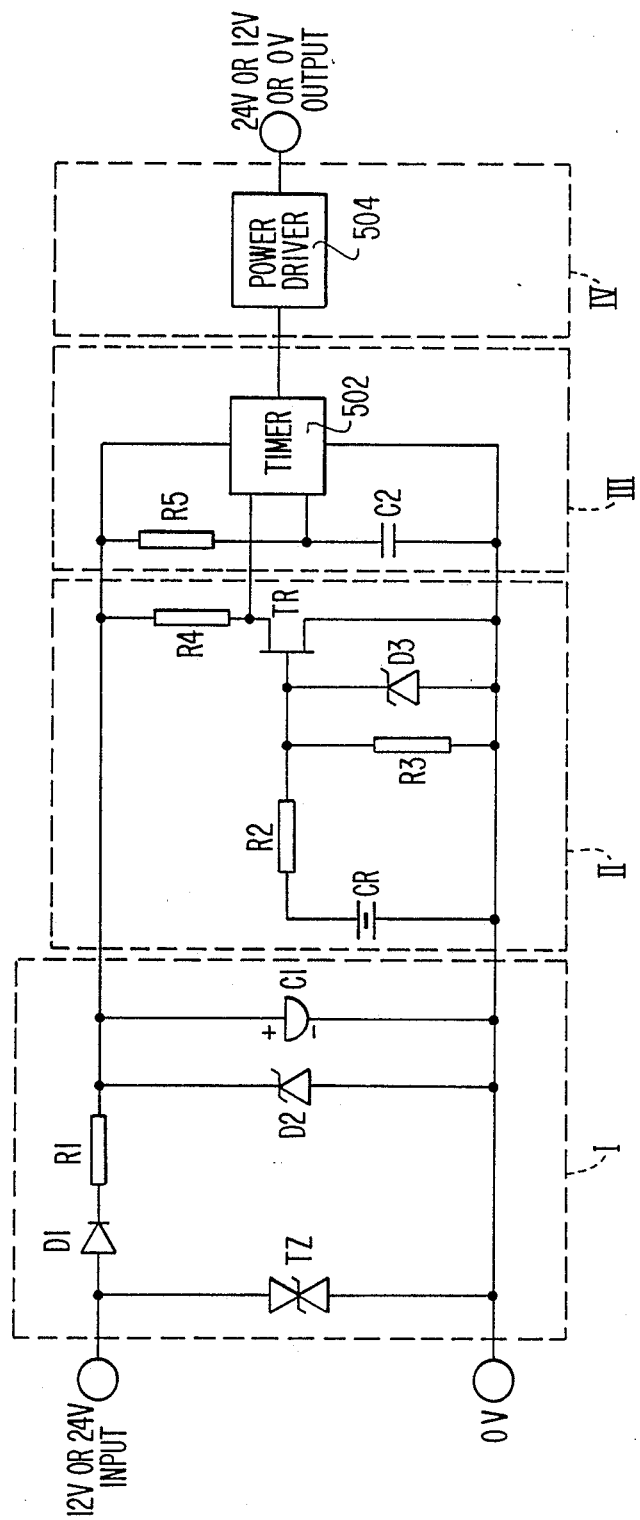
FIG. 5 is a circuit diagram contained on the printed circuit board according to the present invention.

FIG. 5 illustrates the circuit diagram of the circuit contained on the printed circuit board of the VDWS 110. The circuit analyzes the signal obtained from the piezoelectric crystal 50 (labeled CR in FIG. 5) in order to determine when the predetermined threshold has been reached. The circuit also includes an anti-bouncing system that eliminates noise caused by vibrations of the vehicle. The VDWS circuit analyzes the characteristics $\Delta Force/\Delta Time$ of the mechanical input. The circuit is built to be tripped at a specific mechanical input threshold.

As outlined in dotted lines in FIG. 5, the circuit consists of a power supply and regulator I, a piezoelectric sensor and analyzer II, a one shot timer section III and a power driver section IV. The input and output are either 0, 12 or 24 volts depending on the requirements of the particular vehicle including the type of battery used therein.

The power supply I includes a transient voltage suppressor TZ, a reverse voltage safety diode D1, a filter R1, and a voltage regulator consisting of Zener diode D2 and capacitor C1. The piezoelectric sensor and analyzer II consists of the piezoelectric crystal CR, a piezoelectric protector resistor R2, a pull-down resistor R3, a Zener diode protector D3, a switching transistor TR and a pull-up resistor R4. The timer section III consists of a RC time constant including resistor R5 and capacitor C2 and a one-shot timer 502 consisting of a integrated circuit timing device. The power driver section IV consists of a power driver 504 which may be a solid state or relay device as required.

The piezoelectric sensor and analyzer II will switch on the transistor TR as soon as the mechanical deformation of the piezoelectric crystal CR passes beyond a predetermined threshold value (R2+R3+D3). That is, the transistor is switched on when the force of the mechanical deformation or stress occurs within a short enough time period to cause a signal to be generated by the crystal which is above the threshold value. The signal from transistor TR serves as input for the timer 502 which will switch on its' output for 1 second. The output of the timer 502 will activate a solid state driver or a power relay as required to turn on the brake lights. If the brake pedal is not pressed within the one second period, the lights will go out after one second. Otherwise, the lights will remain on in the normal way until the brake pedal is released.

Figure 6:
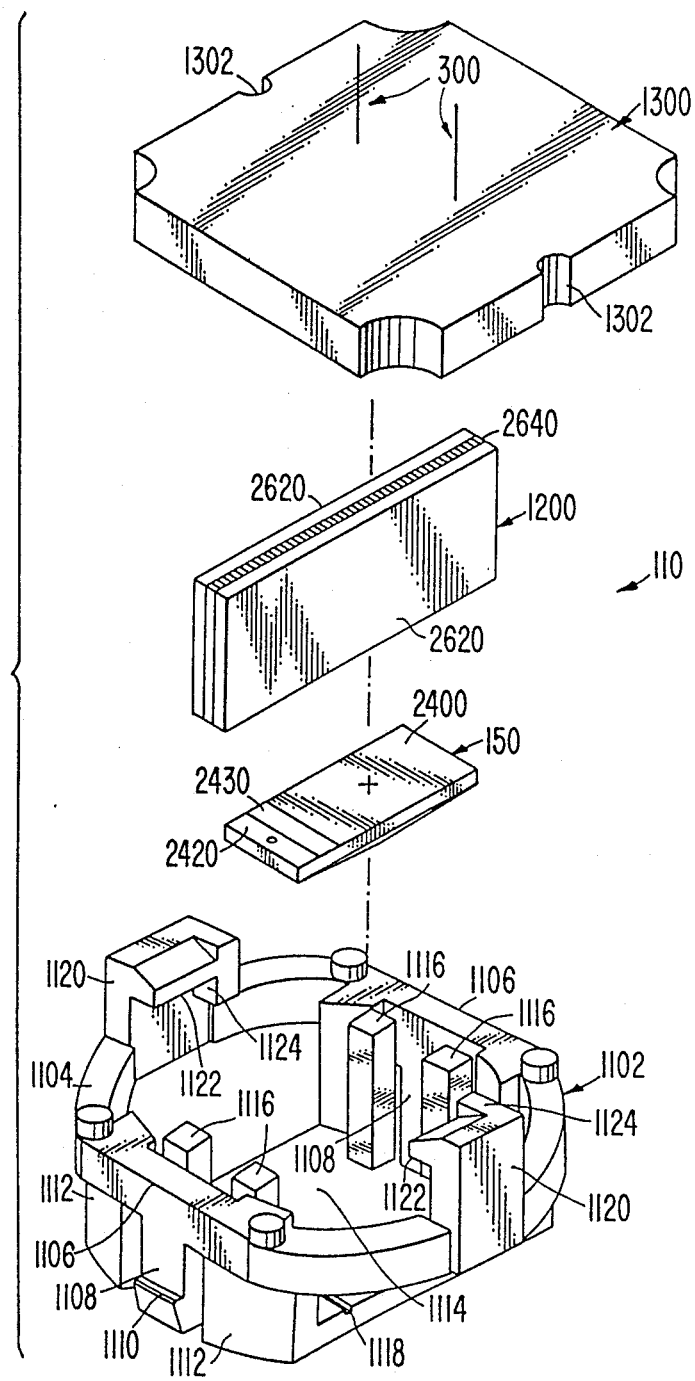
FIG. 6 illustrates an exploded view of a piezoelectric sensor according to a preferred embodiment of the present invention.

A VDWS 110 according to an embodiment of the present invention is shown in an exploded view in FIG. 6. Of course, it is understood that the shape of the housing can be changed according to the requirements of the installation.

Housing 1102 forms a receptacle into which the sensor elements are inserted. Housing 1102 is formed of a material which is rigid but somewhat flexible, for example, plastic or stainless steel. One example of such a plastic material is the product sold under the trademark LEXAN ® manufactured by General Electric Company.

The material must be sufficiently flexible so that it is deformable in response to external pressure which is applied to activate the sensor. It also must be sufficiently flexible to allow such fitting of the various sensor elements within the housing. The material must also be sufficiently rigid so as to protect the piezoelectric crystal from damage.

Housing 1102 includes a ring shaped support 1104 on which all other portions of the housing are attached. Support 1104 has a substantially circular shape, however, two portions thereof form flattened portions 1106. Descending from one surface of support 1104, at portions 1106, are two clips 1108 which can be used to removably secure the sensor to a mounting element for attachment to the gas pedal. These clips 1108 are squeezed toward one another during insertion and, when in place, flange 1110 acts to secure the sensor to the mounting element (not shown).

Also descending from support 1104 at approximately the position of the flattened portions 1106 are supports 1112 which form supports for bridge 1114. Four posts 1116 are attached to bridge 1114 on the inside of support 1104. Two of the posts 1116 are positioned adjacent to each flattened portion 1106 and are spaced from one another along the respective flattened portion. The amount of spacing is sufficient to allow an anisotropic conductive rubber element 1200 (described below) to be inserted therebetween. Groove 1118 is formed in the inside surface of bridge 1114.

Posts 1120 extend from the opposite surface of support 1104 at positions 90°. from flattened portions 1106. Posts 1120 include inwardly facing flanges 1122 which act to keep printed circuit board 1300 in place when the sensor is assembled. The printed circuit board 1300 snaps into place within the housing 1102. Cutouts 1302 on printed circuit board 1300 engage portions 1124 of posts 1120 when the sensor is assembled to assure correct positioning of the sensor elements within housing 1102.

Figure 7:
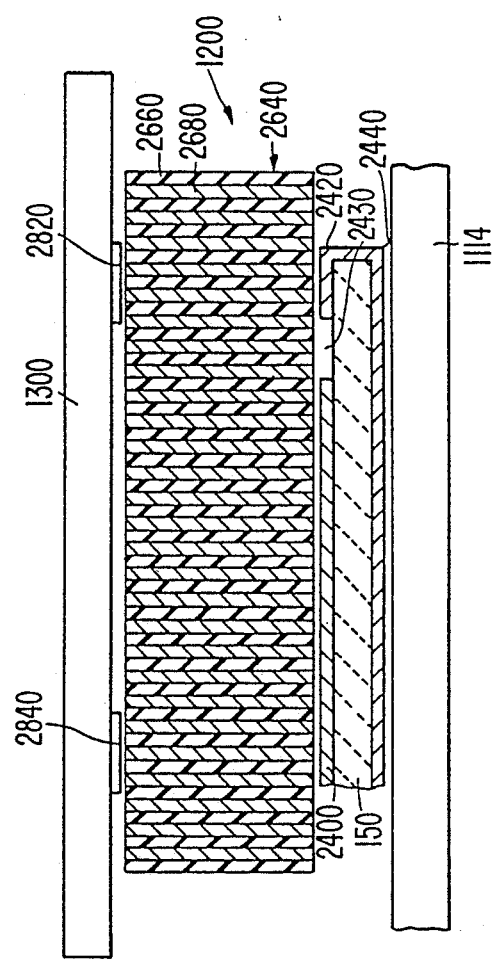
FIG. 7 is a cross-sectional view of the elements of the sensor according to the present invention.

Piezoelectric crystal element 150 is fixed to the undersurface of bridge 1114 by an insulating adhesive 2440 (FIG. 7). Both the positive and the negative contacts, 2400 and 2420, respectively, are located on the side of the crystal which is not fixed to bridge 1114. A gap 2430 is formed between poles 2400 and 2420. In this way, by providing both contacts on one side, the crystal is easily electrically connected to the remainder of the circuit elements. The polarity of the poles is interchangeable.

The piezoelectric crystal element 150 can be made from a standard ceramic material. In the preferred embodiment, PPK21 is used, manufactured by Stettner & Co. of Lauf, Federal Republic of Germany. The piezoelectric crystal exhibits a high coupling factor, high permittivity, high piezoelectric strain constant and broadband behavior through low mechanical Q-factor. Additionally, as mentioned above, the crystal has the inherent characteristic that an increasingly high level electrical signal is generated as the force per unit time exerted on the crystal increases.

The anisotropic conductive elastomeric connector 1200 is disposed so as to have one longitudinal edge extend across the longitudinal exposed face of the piezoelectric element 150. The connector 1200 is inserted into the housing 1102 in the space formed between posts 1116. The connector is held within the housing by the printed circuit 1300 when the board is snapped into place. Connector 1200 may be any anisotropic conductive elastomeric material but is preferably a Series 1000/2000 ZEBRA® connector manufactured by Tecknit Co., of Cranford, N.J. Such a connector is formed as a sandwich, in which a conductive portion 2640 is layered between two insulating layers 2620. Conductive portion 2640 is constructed of strips of insulating material 2660 alternating with strips of conductive material 2680, shown in FIG. 7.

In this particular case, the positive pole 2400 of the piezoelectric ceramic is linked electrically through the conductive portions 2680 of connector 1200 to contact 2840 of printed circuit board 1300. Negative pole 2420 is linked electrically to contact 2820. The anisotropicity caused by the alternating conductive and insulating strips 2680, 2660 permits electrical connection of the respective contacts without short-circuiting of contacts of opposite polarity.

The use of such an elastomeric connector facilitates the snap fitting of the component into the housing 1102 and protects the piezoelectric crystal 150 from physical shock which may come from the direction of the open side of the housing 1102. Furthermore, the combination of the elastomeric connector with the piezoelectric crystal having both poles on one side allows all electrical connections between the crystal and the printed circuit board to be solder-free.

Contacts 300 on circuit board 1300 are used to connect the circuit to the outside world. The contacts may be in any form according to the requirements of the mounting system used to mount the sensor on the accelerator pedal.

Figure 8A:
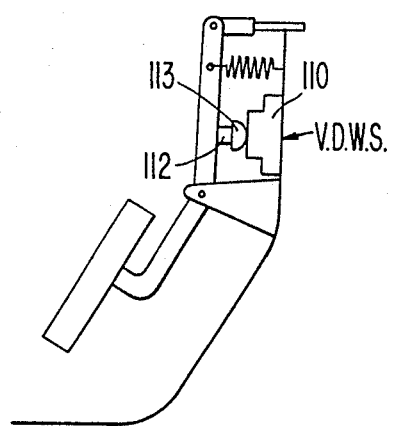
FIGS. 8A, 8B, 8C, 8D, and 8E illustrate various embodiments for mounting the vehicle deceleration warning apparatus according to the present invention.

It is understood that the shape of housing 1102 which houses the piezoelectric crystal 150 may be changed to fit the needs of the particular mounting system used. FIGS. 8A-8E illustrate five embodiments which can be used to mount the VDWS on the accelerator pedal. FIG. 8A illustrates substantially the embodiment described above with respect to FIGS. 3 and 4 where the sensor element 110 and the base 112 and the contact head 113 are located beyond the pivot point. Of course as shown in FIG. 8A, the sensor element 110 is disposed on the floorboard and the contact pin base 112 is on the support arm of the pedal.

Figure 8B:
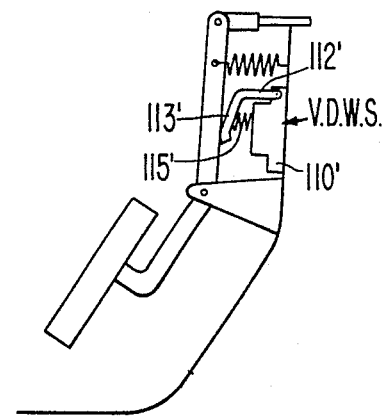

FIG. 8B illustrates an embodiment in which the VDWS is mounted beyond the pivot point of the accelerator pedal and the contact element 112' is pivotally mounted to the sensor element 110'. The contact element 112' includes a contact arm 113' that reaches over the sensor element 110' and is biased by a spring 115' towards the pedal support arm. In FIG. 8B, when the pedal is released, the force of the pedal support arm overcomes the bias force of spring 115' thus compressing the spring, causing a greater level of stress or force on the sensor element 110' and thus on the piezoelectric crystal housed therein.

As noted above with respect to FIGS. 6 and 7, the piezoelectric crystal is made with both the positive and negative poles on one side of the crystal. As shown in FIG. 6, positive pole 2400 covers a substantial portion of the crystal face while negative pole 2420 occupies a smaller portion of the crystal face. Using this configuration, when the crystal is struck quickly, causing an increased amount of stress thereon, a signal is generated which exceeds a predetermined threshold level. The present inventor has discovered that if the polarity of the piezoelectric crystal is reversed, an opposite effect is achieved. That is, if contact with the crystal is maintained, and then released suddenly, causing a decreased amount of stress on the crystal, a signal is generated by the crystal above the predetermined threshold.

Figure 8C:
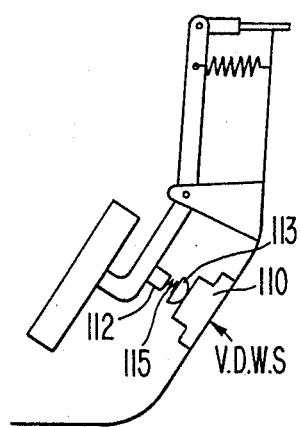
Figure 8D:
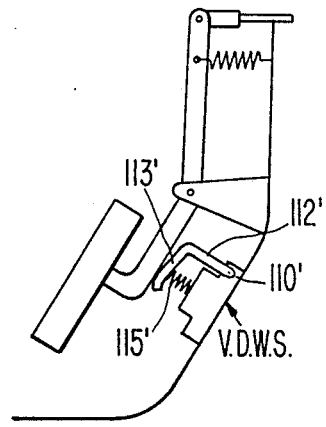
Figure 8E:
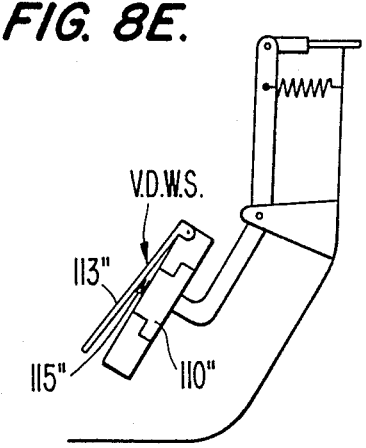

The embodiments shown in FIGS. 8C, 8D and 8E all make use of this principle. In FIGS. 8C and 8D the VDWS is disposed in front of the pivot point of the accelerator. In this way, when the pedal is depressed, the contact head 113 in FIG. 8C is in contact with the housing of the VDWS, and thereby the crystal. In FIG. 8D, spring 115' itself actually is in contact with the housing and is depressed by contact element arm 113' causing increased and decreased amounts of stress on the crystal. In FIG. 8E, the sensor element 110" is mounted within the accelerator pedal. A contact arm 113" is pivotally mounted to the pedal above the VDWS. Contact arm 113" presses on a spring 115, either a coil or a leaf spring, which is in contact with the housing, and thus with the piezoelectric crystal. The springs 115, 115' and 115" allow contact with the crystal even when the pedal is not fully depressed.

When the pedal is quickly released, a signal is generated by the piezoelectric crystal which is above the predetermined threshold level. This signal is analyzed by the circuit described in FIG. 5.

Figure 9A:
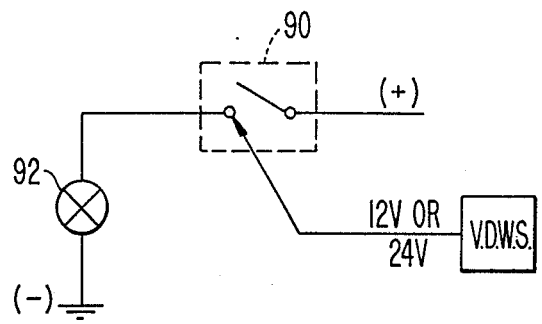
FIGS. 9A and 9B illustrate two examples of the connection of the VDWS according to the present invention to the brake lights.
Figure 9B:
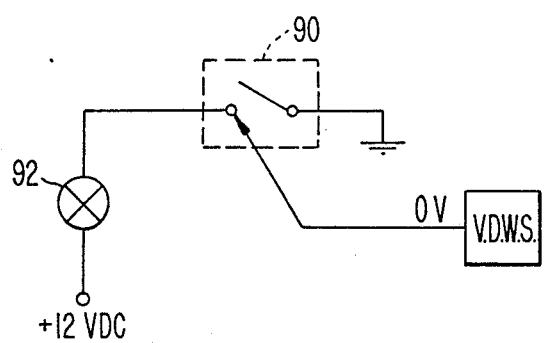

FIGS. 9A and 9B illustrate the connection between the VDWS and the brake lights. The two embodiments are shown because different vehicles require different connections.

In both embodiments, the output of the VDWS is connected to the switch 90 which controls the brake lights in response to brake pedal actuation. In FIG. 9A, one terminal of the switch 90 is connected to the battery, the other terminal is connected to brake lights 92 and brake lights 92 are connected to ground. In this case, the output of the VDWS will either be 12 or 24 volts, depending on the type of battery used. In FIG. 9B, one terminal of the switch 90 is connected to ground, the other terminal is connected to brake lights 92 and brake lights 92 are connected to the battery. In this case, the output of the VDWS will be 0 volts. Thus, switch 90 is closed either by the VDWS or by normal actuation of the brake pedal.

It is understood that the material used to construct the housing may be changed from plastic to for example, metal, or any other suitable material.

The VDWS is a self-contained element which has no moving parts, is easy to assemble and is easily attached to the gas pedal in the vehicle in which is to be used. The VDWS may be connected by the automobile manufacturer at the time of manufacture or may be installed later by the dealer or by the purchaser.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A vehicle deceleration warning apparatus for use in a vehicle having brake lights, a floorboard and an accelerator pedal, said system comprising:
   piezoelectric sensor means connected to one of the accelerator pedal or the floorboard for outputting a first signal when subjected to an appropriate stress condition;
   contact means connected to the other of the accelerator pedal or the floorboard for contacting said piezoelectric sensor means in a manner which is dependent upon the rate of release of the accelerator pedal and causing said sensor means to output said first signal in response thereto; and
   circuit means connected to the brake lights and to said piezoelectric sensor means for analyzing said first signal produced by said piezoelectric sensor means and for actuating the brake lights in response to the analysis when said first signal is above a predetermined threshold.

2. The apparatus according to claim 1, further comprising a housing, wherein said piezoelectric sensor means comprises a piezoelectric crystal, said crystal being contained within said housing and connected to said housing such that contact with said housing causes said crystal to be subjected to a stress condition, said crystal being also connected to an input of said circuit means, the input being adapted to receive said first signal.

3. The apparatus according to claim 2, wherein said circuit means comprises:
   signal generating means connected to said piezoelectric crystal for generating a second signal when said first signal is above a predetermined threshold;
   a transistor for receiving said second signal, said transistor being switched to an on state in response to said second signal;
   timer means having an output which is switched on for a predetermined time period in response to the on state of the transistor; and
   driver means connected between said timer means and the brake lights for turning on the brake lights at least for the predetermined time period in response to the output of said timer means.

4. The apparatus according to claim 2, wherein said contact means comprises:
   a base connected to a portion of an accelerator pedal support arm beyond a pivot point on the support arm with respect to a head portion of the pedal; and
   a contact head connected to said base,
   wherein said housing is disposed on the floorboard at a position corresponding to the position of the base on the support arm, and whereby said contact head is separated from said housing when the accelerator pedal is depressed and is brought towards contact with said housing when the accelerator pedal is released thus causing the crystal to be subjected to a stress condition by the contact head, wherein the stress condition applied to the crystal is the appropriate stress condition when the rate of release of the pedal is faster than a particular rate.

5. The apparatus according to claim 2, wherein said contact means comprises:
   a contact arm having a pivot end pivotally connected to said housing and a free end;
   spring means connected between said housing and said free end,
   wherein said housing is disposed on the floorboard at a position corresponding to a portion of an accelerator pedal support arm beyond a pivot point on the support arm with respect to a head portion of the pedal, and whereby said contact arm free end is separated from said housing when the accelerator pedal is depressed and is brought towards contact with said housing when the accelerator pedal is released causing the crystal to be subjected to a stress condition by the spring means, wherein the stress condition applied to the crystal is the appropriate stress condition, when the rate of release of the pedal is faster then a particular rate.

6. The apparatus according to claim 2, wherein said contact means comprises:
   a base connected to a portion of an accelerator pedal support arm between a pivot point on the support arm and a head portion of the pedal; and
   spring means having one end connected to said base;
   a contact head connected to a second end of said spring means, and
   wherein said housing is disposed on the floorboard at a position corresponding to the position of the base on the support arm, and whereby said contact head is brought towards contact with said housing when the accelerator pedal is depressed and is separated from said housing when the accelerator pedal is released causing the crystal to be subjected to a stress condition by the contact head wherein the stress condition applied to the crystal is the appropriate stress condition when the rate of release of the pedal is faster than a particular rate.

7. The apparatus according to claim 2, wherein said contact means comprises:
   a contact arm having a pivot end pivotally connected to said housing and a free end;
   spring means connected between said housing and said free end,
   wherein said housing is disposed on the floorboard at a position corresponding to a portion of an accelerator pedal support arm between a pivot point on the support arm and a head portion of the pedal, and whereby said contact arm is brought towards contact with said housing when the accelerator pedal is depressed and is separated from said housing when the accelerator pedal is released causing the crystal to be subjected to a stress condition by the spring means, wherein the stress condition applied to the crystal is the appropriate stress condition when the rate of release of the pedal is faster than a particular rate.

8. The apparatus according to claim 2, wherein the accelerator pedal comprises a head portion, said housing being disposed within said head portion, and wherein said contact means comprises:
   a contact arm pivotally connected to said accelerator pedal head portion and adapted to receive a driver's foot;
   spring means connected between said contact arm and said head portion, wherein said contact element is brought towards contact with said housing when the accelerator pedal is depressed and is separated from said housing when the accelerator pedal is released causing the crystal to be subjected to a stress condition by the spring means, wherein the stress condition applied to the crystal is the appropriate stress condition when the rate of release of the pedal is faster than a particular rate.

9. The apparatus according to claim 2, wherein said contact means comprises:

a base connected to the floorboard beyond a pivot point of an accelerator pedal support arm with respect to the pedal; and a contact head connected to said base, wherein said housing is disposed on a portion of the accelerator pedal support arm at a position corresponding to the position of the base on the floorboard, and whereby said contact head is separated from said housing when the accelerator pedal is depressed and is brought towards contact with said housing when the accelerator pedal is released causing the crystal to be subjected to a stress condition by the spring means, wherein the stress condition applied to the crystal is the appropriate stress condition when the rate of release of the pedal is faster than a particular rate.

* * * * *